United States Patent [19]

Joyner

[11] Patent Number: 5,626,519

[45] Date of Patent: May 6, 1997

[54] BEARING RETAINER WITH BEARING RETAINING PROJECTION

[75] Inventor: Robert G. Joyner, Toledo, Ohio

[73] Assignee: Dana Corporation, Toledo, Ohio

[21] Appl. No.: 566,930

[22] Filed: Dec. 4, 1995

[51] Int. Cl.$^6$ ............................................. F16C 33/46
[52] U.S. Cl. ........................... 464/128; 384/551; 384/572; 464/130
[58] Field of Search ............................ 464/112, 130, 464/131, 132, 134, 135, 136, 128; 384/580, 572, 574, 577, 520, 521

[56] References Cited

U.S. PATENT DOCUMENTS

| | | |
|---|---|---|
| 71,973 | 10/1867 | Burnap . |
| 522,214 | 7/1894 | Hyatt ........................... 384/551 |
| 1,226,685 | 5/1917 | Modler ......................... 384/551 |
| 1,426,578 | 8/1922 | Lott ............................. 384/577 |
| 2,996,901 | 8/1961 | Kleinschmidt ............... 464/131 |
| 3,046,066 | 7/1962 | Lobeck et al. ............... 384/577 |
| 3,963,282 | 6/1976 | Penny . |
| 3,993,176 | 11/1976 | Marola et al. . |
| 4,173,129 | 11/1979 | Durham ....................... 464/130 |
| 4,611,932 | 9/1986 | Olschewski et al. ......... 464/131 |
| 4,645,474 | 2/1987 | Olschewski et al. ......... 464/131 |
| 4,874,349 | 10/1989 | Gall . |
| 4,932,923 | 6/1990 | Tompson ...................... 464/131 |
| 4,934,979 | 6/1990 | Gille et al. ................... 464/130 |
| 4,976,551 | 12/1990 | Scharting et al. . |
| 5,044,788 | 9/1991 | Murphy et al. . |
| 5,189,791 | 3/1993 | Alling ...................... 384/572 X |
| 5,226,739 | 7/1993 | Estkowski et al. . |
| 5,501,532 | 3/1996 | Terrill .......................... 384/572 |

FOREIGN PATENT DOCUMENTS

| | | | |
|---|---|---|---|
| 1082087 | 5/1960 | Germany ..................... | 384/572 |
| 52832 | 1/1922 | Sweden ....................... | 384/520 |
| 56828 | 6/1924 | Sweden ....................... | 384/577 |

Primary Examiner—Daniel P. Stodola
Assistant Examiner—Eileen A. Dunn
Attorney, Agent, or Firm—MacMillan, Sobanski & Todd

[57] ABSTRACT

A structure for retaining a plurality of roller bearings within a bearing cup prior to being assembled on a trunnion of a universal joint assembly is disclosed. The bearing cup is generally hollow and cylindrical in shape, including a side wall defining an inner circumferential surface and a closed end defining an inner end surface. A plurality of roller bearings is disposed within the bearing cup adjacent to the inner cylindrical surface thereof. A first roller bearing retainer is disposed adjacent to the open end of the bearing cup, while a second roller bearing retainer is disposed adjacent to the closed end of the bearing cup. Each of the roller bearing retainers includes a generally flat annular plate having a plurality of relatively short projections extending therefrom. Preferably, the projections are formed integrally with the annular plate and extend from the inner peripheral edge generally perpendicular to the plane defined by the upper surface thereof. The projections formed on the first roller bearing retainer extend upwardly from the annular plate between each adjacent pair of the roller bearings. Similarly, the projections formed on the second roller bearing retainer extend downwardly from the annular plate between each adjacent pair of the roller bearings. The lower ends of the roller bearings are retained adjacent to the inner surface of the bearing cup by the projections formed on the first roller bearing retainer, while the upper ends of the roller bearings are retained adjacent to the inner surface of the bearing cup by the projections formed on the second roller bearing retainer. Consequently, the roller bearings are prevented from moving radially inwardly away from the inner surface of the bearing cup prior to installment on a trunnion of a universal joint.

20 Claims, 3 Drawing Sheets

BEARING RETAINER WITH BEARING RETAINING PROJECTION

BACKGROUND OF THE INVENTION

This invention relates in general to universal joint assemblies and in particular to a retainer for holding the bearings within a bearing cup of a universal joint assembly prior to assembly on a trunnion.

Universal joints are well known devices which provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly therefrom. The trunnions are oriented in a single plane and extend at right angles relative to one another. A hollow cylindrical bearing cup having a closed end is mounted on the end of each of the trunnions. A plurality of bearings, such as roller bearings or needle bearings, are provided between the outer cylindrical surface of a given trunnion and the inner cylindrical surface of the associated bearing cup to permit relative rotational movement therebetween. The bearing cups which are mounted on a first opposed pair of the trunnions can be connected to a first end yoke secured to an end of a first drive shaft section, while the bearing cups mounted on a second opposed pair of the trunnions can be connected to a second end yoke secured to an end of a second drive shaft section.

To assemble the bearing cup on the trunnion of the universal joint, the plurality of roller bearings are initially disposed within the bearing cup. The roller bearings are positioned about the inner cylindrical surface thereof, with the axial ends of the roller bearings being located adjacent to the closed end and the open end of the bearing cup. The roller bearings are not positively retained within the bearing cup prior insertion of the trunnion therein. To prevent the roller bearings from falling out of the bearing cup during assembly, it is known to apply a somewhat tacky grease material between the roller bearings and the inner cylindrical surface of the bearing cup. The tackiness of the grease material is usually sufficient to retain the roller bearings within the bearing cup until the trunnion is inserted therein.

However, in some instances, the bearing cup and roller bearings are assembled in a first location and shipped to a second location prior to being installed on the trunnion. In these instances, the tacky grease material has been found to be insufficient of itself to retain the roller bearings within the bearing cup during the relatively rough handling sometime encountered during shipment. To address this, it is also known in the art to retain the roller bearings within the bearing cup by providing washers or seals within the bearing cup at one or both axial ends of the roller bearings. Unfortunately, known structures of this type have required that close tolerances be maintained between the roller bearings, the trunnion, and the bearing cup to prevent restriction of the free rotational movement of the roller bearings during use. Accordingly, it would be desirable to provide an improved structure for retaining the bearings within the bearing cup prior to assembly on the trunnion which is simple and inexpensive in construction and assembly.

SUMMARY OF THE INVENTION

This invention relates to an improved structure for retaining a plurality of bearings, such as roller bearings, within a bearing cup prior to being assembled on a trunnion of a universal joint assembly. The bearing cup is generally hollow and cylindrical in shape, including a side wall defining an inner circumferential surface and a closed end defining an inner end surface. A plurality of roller bearings is disposed within the bearing cup adjacent to the inner cylindrical surface thereof. A first bearing retainer is disposed adjacent to the open end of the bearing cup, while a second bearing retainer is disposed adjacent to the closed end of the bearing cup. Each of the bearing retainers includes a generally flat annular plate having a plurality of relatively short projections extending therefrom. Preferably, the projections are formed integrally with the annular plate and extend from the inner peripheral edge generally perpendicular to the plane defined by the upper surface thereof. The projections formed on the first bearing retainer extend upwardly from the annular plate between each adjacent pair of the roller bearings. Similarly, the projections formed on the second bearing retainer extend downwardly from the annular plate between each adjacent pair of the roller bearings. The lower ends of the roller bearings are retained adjacent to the inner surface of the bearing cup by the projections formed on the first bearing retainer, while the upper ends of the roller bearings are retained adjacent to the inner surface of the bearing cup by the projections formed on the second bearing retainer. Consequently, the roller bearings are prevented from moving radially inwardly away from the inner surface of the bearing cup prior to installment on a trunnion of a universal joint.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
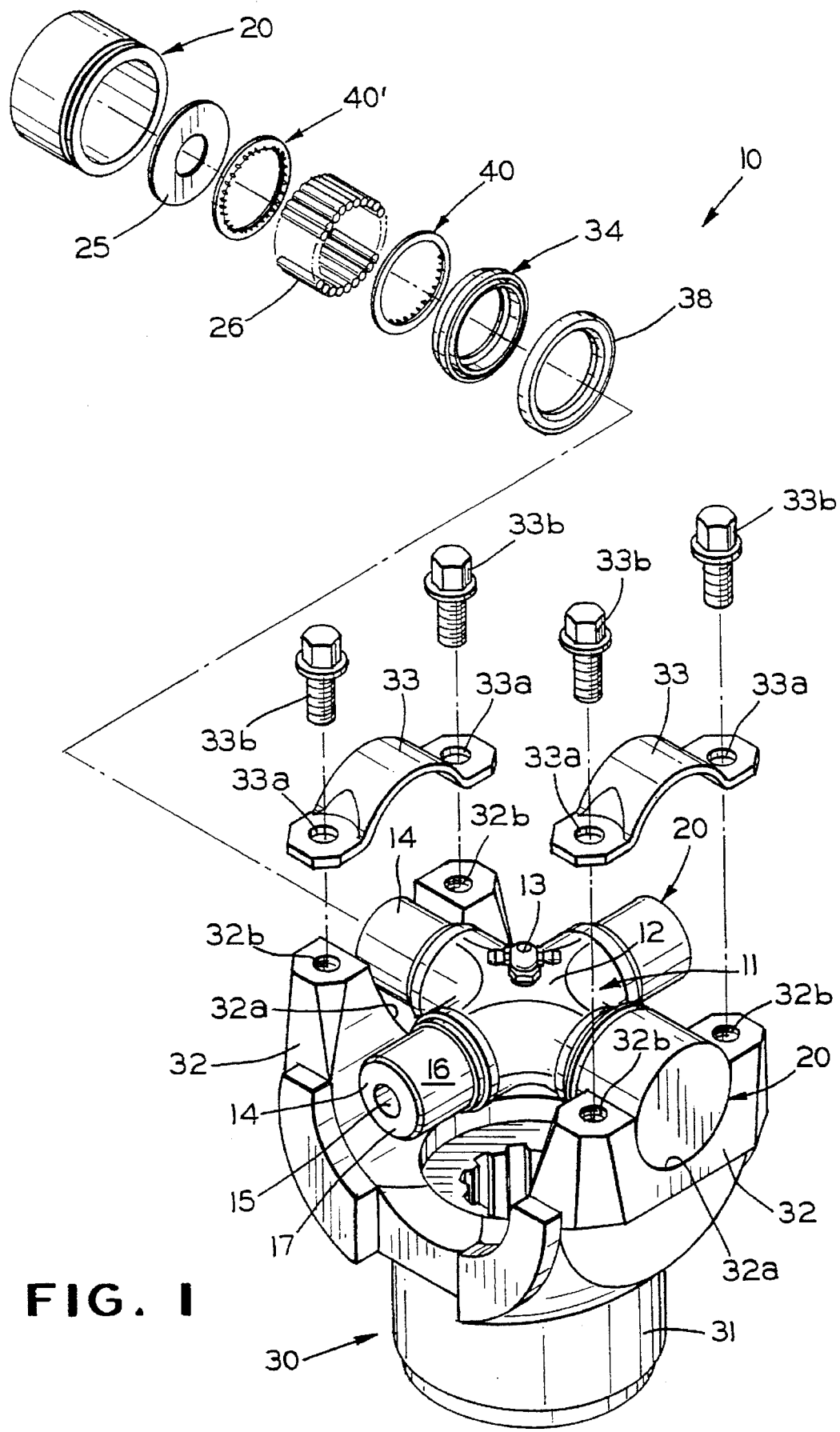
FIG. 1 is an exploded perspective view of a universal joint assembly including a pair of bearing retainers mounted within a bearing cup in accordance with this invention.
Figure 2:
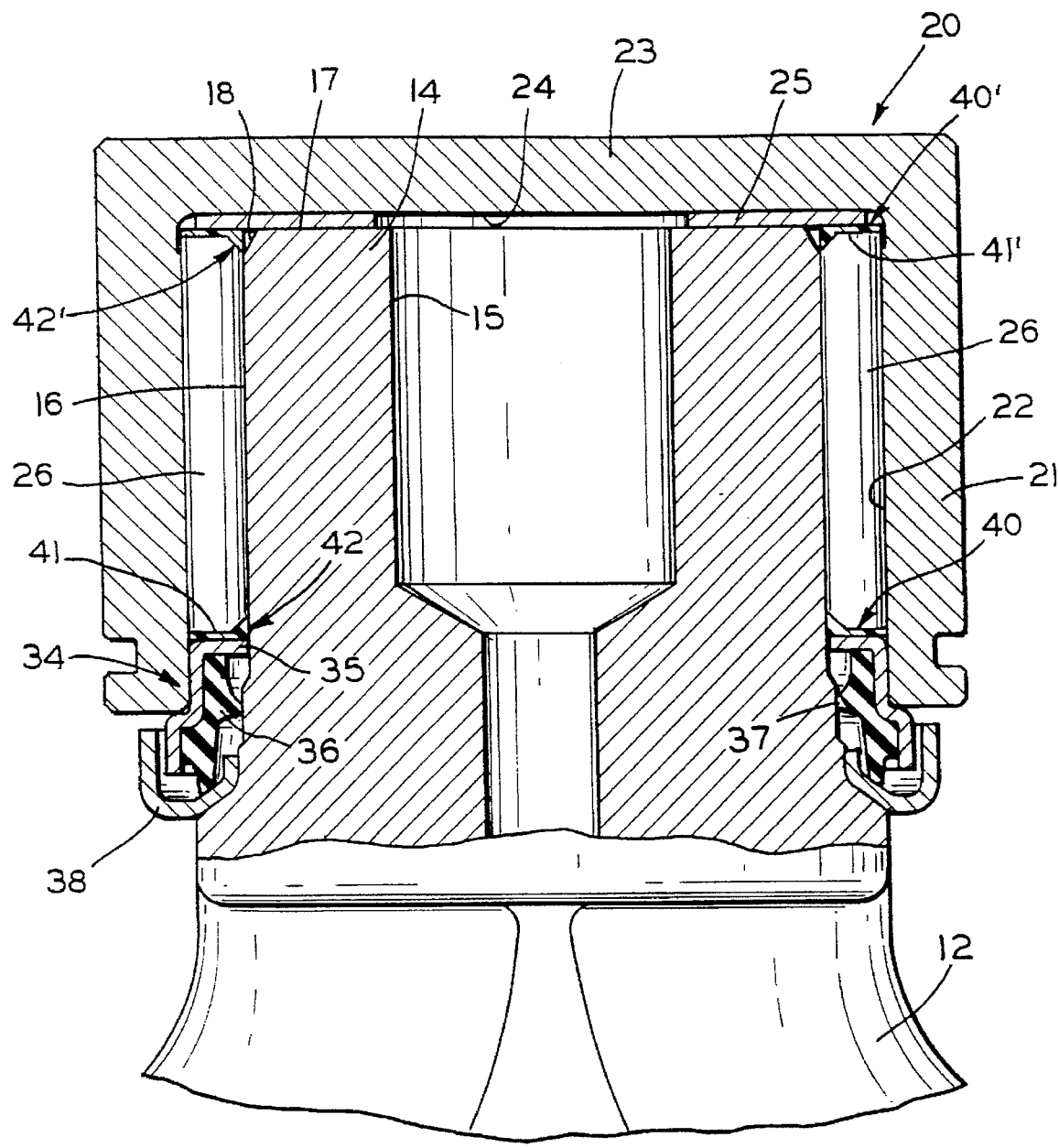
FIG. 2 is an enlarged elevational view, partially in cross section, of one of the trunnions of the universal joint assembly illustrated in FIG. 1 having the bearing cup mounted thereon.

Referring now to the drawings, there is illustrated in FIGS. 1 and 2 a universal joint assembly, indicated generally at 10. The universal joint assembly 10 includes a cross, indicated generally at 11, having a central body portion 12. A conventional lubrication fitting 13 is mounted on the body portion 12 of the cross 11. The lubrication fitting 13 provides one way fluid communication into an internal chamber (not shown) formed within the cross 11. The cross 11 further includes four cylindrical trunnions 14 which extend radially outwardly from the body portion 12 in a common plane at fight angles relative to one another. An internal passageway 15 is formed through each of the trunnions 14. The internal passageways 15 communicate with the internal chamber formed in the cross 11. As a result, lubricant injected through the lubrication fitting 13 passes through the internal chamber into each of the internal passageways 15, as is well known in the art. Each of the trunnions 14 is generally cylindrical in shape, including a cylindrical side surface 16 and an outer end surface 17. An annular chamfer 18 is formed at the junction between the cylindrical side surface 16 and the outer end surface 17 of each of the trunnions 14.

A bearing cup, indicated generally at 20, is mounted on the end of each of the trunnions 14. Each of the bearing cups 20 is generally hollow and cylindrical in shape, including a side wall 21 defining an inner circumferential surface 22 and a closed end 23 defining an inner end surface 24. When assembled, the inner end surface 24 of the closed end 23 of the bearing cup 20 is disposed adjacent to the outer end surface 17 of the trunnion 14. An annular thrust washer 25 is disposed between the inner end surface 24 of the bearing cup 20 and the outer end surface 17 of the trunnion 14. As will be explained in greater detail below, the bearing cups 20 are supported on the ends of the trunnions 14 for relative rotational movement.

A plurality of bearings are provided between each of the bearing cups 20 and its associated trunnion 14 to permit low friction rotational movement to therebetween. As shown in FIG. 2, the bearings may be embodied as a plurality of roller or needle bearings 26 (only two are illustrated). The roller bearings 26 are disposed between the cylindrical side surface 16 of each of the trunnions 14 and the inner cylindrical surface 22 of the associated bearing cup 20. However, it will be appreciated that any type of bearing may be used to permit low friction rotational movement between the bearing cups 20 and the trunnions 14.

Referring back to FIG. 1, the universal joint assembly 10 further includes a half round end yoke, indicated generally at 30. The end yoke 30 includes a body portion 31 having a pair of opposed arms 32 extending outwardly therefrom. Each of the opposed arms 32 has a semi-cylindrical recess 32a formed therein. A pair of threaded apertures 32b are formed on each of the opposed arms 32 adjacent to the semi-cylindrical recess 32a. When the cross 11 is assembled with the end yoke 30, the bearing cups 20 mounted on two opposed trunnions 14 of the cross 11 are received in the semi-cylindrical recesses 32a of the opposed arms 32 of the end yoke 30. Retainer straps 33 are provided for retaining these bearing cups 20 within the semi-cylindrical recesses 32a of the end yoke 30. The retainer straps 33 are conventional in the art, each having a curved central portion which extends partially about the outer surface of the associated bearing cup 20. Each of the retainer straps 33 terminates in a pair of end portions having respective non-threaded openings 33a formed therethrough. Threaded fasteners 33b extend through the non-threaded openings 33a into cooperation with the threaded apertures 32b to secure the retainer straps 33 to the opposed arms 32 of the end yoke 30. As a result, the bearing cups 20 are retained within the respective semi-cylindrical recesses 32a of the end yoke 30.

A generally annular seal assembly, indicated generally at 34, is disposed about the open end of the bearing cup 20. The seal assembly 34 is conventional in the art and includes a rigid support ting 35 having an elastomeric seal 36 secured thereto, as best shown in FIG. 2. The support ring 35 engages the inner cylindrical surface 22 of the bearing cup 20 in a press fit relationship. A portion of the illustrated support ring 35 extends radially inwardly toward the trunnion 14, although such is not necessary. The elastomeric seal 36 is secured to the support ring 35 by any conventional means, such as by adhesive bonding. One or more lips 37 are formed on the elastomeric seal 36 and extend radially inwardly into sealing engagement with the cylindrical side surface 16 of the trunnion 14. An annular dust guard 38 is disposed about the open end of the bearing cup 20. The dust guard 38 is also conventional in the art and is formed from a relatively stiff material, such as nylon. The illustrated dust guard 38 is mounted on the cylindrical side surface 16 of the trunnion 14 in a press fit relationship, although such is not necessary. For example, the dust guard 38 may be mounted on the outer cylindrical surface of the bearing cup 20.

The universal joint assembly 10 further includes first and second bearing retainers, indicated generally at 40 and 40'. As best shown in FIG. 2, the first bearing retainer 40 is disposed between the lower ends of the roller bearings 26 and the annular seal assembly 34, adjacent to the open end of the bearing cup 20. The second bearing retainer 40' is disposed between the upper ends of the roller bearings 26 and the thrust washer 25, adjacent to the closed end of the bearing cup 20. The two bearing retainers 40 and 40' are identical in structure and operation. Therefore, only the first bearing retainer 40 will be described and illustrated in detail.

Figure 3:
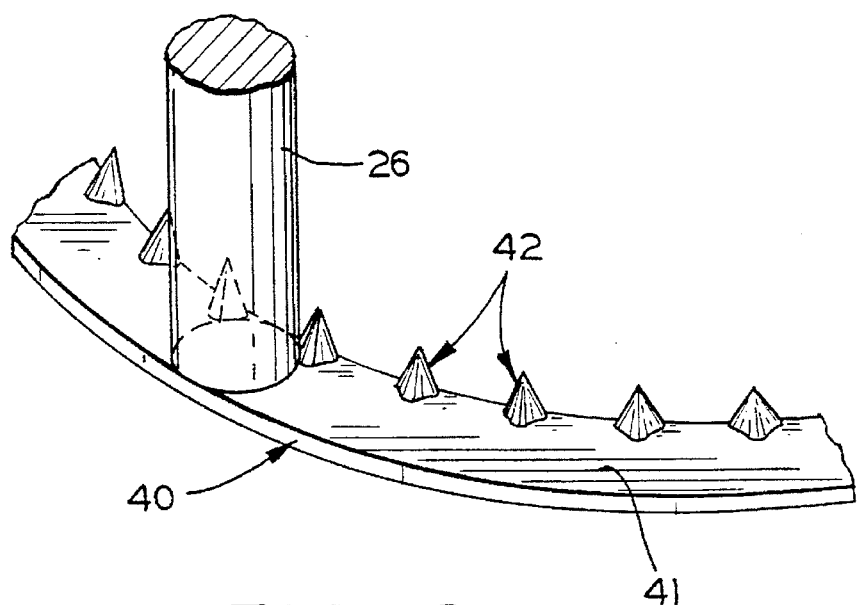
FIG. 3 is an enlarged perspective view of a portion of the bearing retainer illustrated in FIGS. 1 and 2, together with one of the roller bearings.
Figure 4:
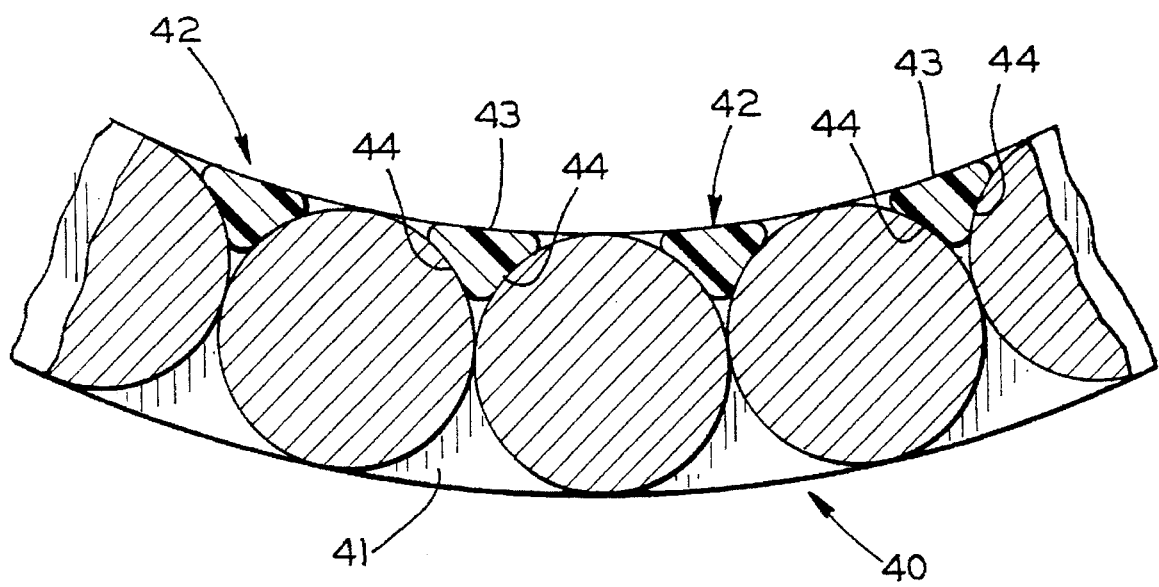
FIG. 4 is an enlarged top sectional view of the bearing retainer and a plurality of roller bearings as illustrated in FIG. 3.

The structure of the bearing retainer 40 is illustrated in detail in FIGS. 3 and 4. As shown therein, the bearing retainer 40 includes a generally flat annular plate 41 defining upper and lower planar surfaces and inner and outer peripheral edges. The thickness of the annular plate 41 is preferably maintained at a minimum while retaining sufficient strength to remain integral and avoid deformation. It has been found desirable to form the annular plate 41 (as well as the other portions thereof) from plastic, nylon or other polymeric materials. However, the bearing retainer 40 may be formed from other suitable materials.

At least one, and preferably a plurality, of relatively short projections, indicated generally at 42, extend upwardly from the upper surface of the annular plate 41. Preferably, the projections 42 are formed integrally with the annular plate 41 and extend upwardly from the inner peripheral edge generally perpendicular to the plane defined by the upper surface thereof. In the illustrated embodiment, the projections 42 are formed having identical shapes and are equidistantly spaced about the annular plate 41, although such is not necessary. In the preferred embodiment, the bearing retainer 40 is formed having the same number of projections 42 as the number of roller bearings 26. Thus, as best shown in FIG. 4, one of the projections 42 extends upwardly between each adjacent pair of the roller bearings 26. Alternatively, for example, the bearing retainer 40 can be formed having half number of projections 42 as the number of roller bearings 26. In this instance, one of the projections 42 would extend upwardly between alternating adjacent pairs of the roller bearings 26.

The shapes of the projections 42 is illustrated in detail in FIGS. 3 and 4. As shown therein, each of the projections 42 is generally pyramidal in shape. Thus, each of the projections has a generally triangular cross sectional shape including an inner side 43 and two outer sides 44. The inner sides 43 of the projections 42 face radially inwardly and extend generally along the inner peripheral edge of the annular plate 41 when viewed from above. Preferably, the inner sides 43 are slightly concavely curved to conform to the radius of curvature of the inner peripheral edge of the annular plate 41. The outer sides 44 of the projections face outwardly at opposed angles toward the outer peripheral edge of the annular plate 41. Preferably, the outer sides 44 are slightly concavely curved to conform to the radius of curvature of the radius of curvature of the roller bearings 26. The edges along which the inner sides 43 and the outer sides 44 intersect are preferably curved to avoid sharp edges. In the preferred embodiment, the projections 40 taper in size as they extend upwardly so as to terminate in a point. However, the projections 40 may be formed having a uniform cross section as they extend upwardly.

As mentioned above, the first bearing retainer 40 is disposed between the lower ends of the roller bearings 26 and the annular seal assembly 34, adjacent to the open end of the bearing cup 20. In this position, the projections 42 extend upwardly from the annular plate 41 between each adjacent pair of the roller bearings 26. Similarly, the second bearing retainer 40' is disposed between the upper ends of the roller bearings 26 and the thrust washer 25, adjacent to the closed end of the bearing cup 20. The projections 42' formed on the second bearing retainer 40' extend downwardly from the annular plate 41' between each adjacent pair of the roller bearings 26.

To assemble the bearing cup assembly, the thrust washer 25 is initially disposed within the bearing cup 20 adjacent to the closed end 23 thereof. Then, the second bearing retainer 40' is disposed within the bearing cup 20 adjacent to the thrust washer 25. Next, the roller bearings 26 are inserted within the bearing cup 20 adjacent to the inner surface 22 thereof. When so inserted, the upper ends of the roller bearings 26 are retained by adjacent projections 42' formed on the second bearing retainer 40'. Consequently, the upper ends of the roller bearings 26 are prevented from moving radially inwardly away from the inner surface 22 of the bearing cup 20. Next, the first bearing retainer 40 is disposed within the bearing cup 20. Similar to the second bearing retainer 40', the lower ends of the roller bearings 26 are retained by adjacent projections 42 formed on the first bearing retainer 40. Consequently, the lower ends of the roller bearings 26 are also prevented from moving radially inwardly away from the inner surface 22 of the bearing cup 20. Lastly, the annular seal assembly 34 is pressed into the open end of the bearing cup 20. Thus, it can be seen that the bearing retainers 40 and 40' function to retain the roller bearings 26 within the bearing cup 20, adjacent to the inner surface 22 thereof. The bearing retainers 40 and 40' function in this manner to prevent the roller bearings 26 from becoming dislodged prior to being installed on the trunnion 14, as described above.

Although the bearing retainers 40 and 40' have been described and illustrated in their preferred embodiments, it will be appreciated that other similar structures are contemplated to be within the scope of this invention. For example, the cross sectional shapes of the projections 42 may be different that as specifically illustrated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A bearing cup assembly adapted to be installed on a trunnion of a universal joint, said bearing cup assembly comprising:

a bearing cup including an inner surface, a closed end, and an open end;

a plurality of bearings disposed within said bearing cup inwardly of and adjacent to said inner surface thereof; and a bearing retainer disposed within said bearing cup, said bearing retainer including a plurality of projections extending adjacent to and engaging only the portions of said bearings which are remote from the inner surface of the bearing cup to retain said bearings adjacent to said inner surface of said bearing cup prior to installation on the trunnion of the universal joint.

2. The bearing cup assembly defined in claim 1 wherein said bearing retainer includes a plate having said plurality of projections extending therefrom.

3. The bearing cup assembly defined in claim 2 wherein said plate is annular in shape and defines an inner peripheral edge and an outer peripheral edge, said projections extending from said inner peripheral edge of said plate.

4. The bearing cup assembly defined in claim 2 wherein said projections are formed integrally with said plate.

5. The bearing cup assembly defined in claim 1 wherein each of said projections has an inner side and a pair of outer sides, said outer sides of said projections engaging said portions of said bearings.

6. The bearing cup assembly defined in claim 5 wherein each of said projections is generally pyramidal in shape.

7. The bearing cup assembly defined in claim 5 wherein each of said projections is generally triangular in cross sectional shape.

8. The bearing cup assembly defined in claim 1 wherein said bearings extend between first ends disposed adjacent to said closed end of said bearing cup and second ends disposed adjacent to said open end of said bearing cup, and wherein said projections engage one of said first and second ends of said bearings.

9. The bearing cup assembly defined in claim 8 wherein said bearing retainer is a first bearing retainer having a first plurality of projections extending therefrom, said first projections engaging said first ends of said bearings, and wherein said bearing cup assembly further includes a second bearing retainer having a second plurality of projections extending therefrom, said second projections engaging said second ends of said bearings.

10. The bearing cup assembly defined in claim 9 wherein said first bearing retainer includes a first plate having said first plurality of projections extending therefrom, and wherein said second bearing retainer includes a second plate having said second plurality of projections extending therefrom.

11. A bearing cup assembly adapted to be installed on a trunnion of a universal joint, said bearing cup assembly comprising:

a bearing cup including an inner surface, a closed end, and an open end;

a plurality of bearings disposed within said bearing cup inwardly of and adjacent to said inner surface thereof, said bearings extending from respective first ends disposed adjacent to said closed end of said bearing cup to respective second ends disposed adjacent to said open end of said bearing cup; and a bearing retainer disposed within said bearing cup, said bearing retainer including a plate having a plurality of projections extending therefrom adjacent to and engaging only the portions of said bearings which are remote from the inner surface of the bearing cup to retain said bearings adjacent to said inner surface of said bearing cup prior to installation on the trunnion of the universal joint, a portion of said plate extending between one of said first and second ends of said bearings and one of said closed and open ends of said bearing cup, respectively.

12. The bearing cup assembly defined in claim 11 wherein said plate is annular in shape and defines an inner peripheral edge and an outer peripheral edge, said projections extending from said inner peripheral edge of said plate.

13. The bearing cup assembly defined in claim 11 wherein said projections are formed integrally with said plate.

14. The bearing cup assembly defined in claim 11 wherein each of said projections has an inner side and a pair of outer sides, said outer sides of said projections engaging said portions of said bearings.

15. The bearing cup assembly defined in claim 14 wherein each of said projections each of the projections is generally pyramidal in shape.

16. The bearing cup assembly defined in claim 14 wherein each of said projections each of the projections is generally triangular in cross sectional shape.

17. The bearing cup assembly defined in claim 11 wherein said bearings extend between first ends disposed adjacent to said closed end of said bearing cup and second ends disposed adjacent to said open end of said bearing cup, and wherein said projections engage one of said first and second ends of said bearings.

18. The bearing cup assembly defined in claim 17 wherein said bearing retainer is a first bearing retainer having a first plurality of projections extending therefrom, said first projections engaging said first ends of said bearings, and wherein said bearing cup assembly further includes a second bearing retainer having a second plurality of projections extending therefrom, said second projections engaging said second ends of said bearings.

19. The bearing cup assembly defined in claim 18 wherein said first bearing retainer includes a first plate having said first plurality of projections extending therefrom, and wherein said second bearing retainer includes a second plate having said second plurality of projections extending therefrom.

20. A universal joint assembly comprising:

a cross including a body having a plurality of trunnions extending therefrom; and a bearing cup assembly mounted on the end of each of said trunnions, each of said bearing cup assemblies including: a bearing cup including an inner surface, a closed end, and an open end; a plurality of bearings disposed within said bearing cup inwardly of and adjacent to said inner surface thereof; and a bearing retainer disposed within said bearing cup, said bearing retainer including a plurality of projections extending adjacent to and engaging only the portions of said bearings which are remote from the inner surface of the bearing cup to retain said bearings adjacent to said inner surface of said bearing cup prior to installation on the trunnion of the universal joint.

\* \* \* \* \*